Aug. 31, 1965   J. P. BUSBY, SR   3,204,085
HEATING DEVICE
Filed Aug. 15, 1962                           5 Sheets-Sheet 3
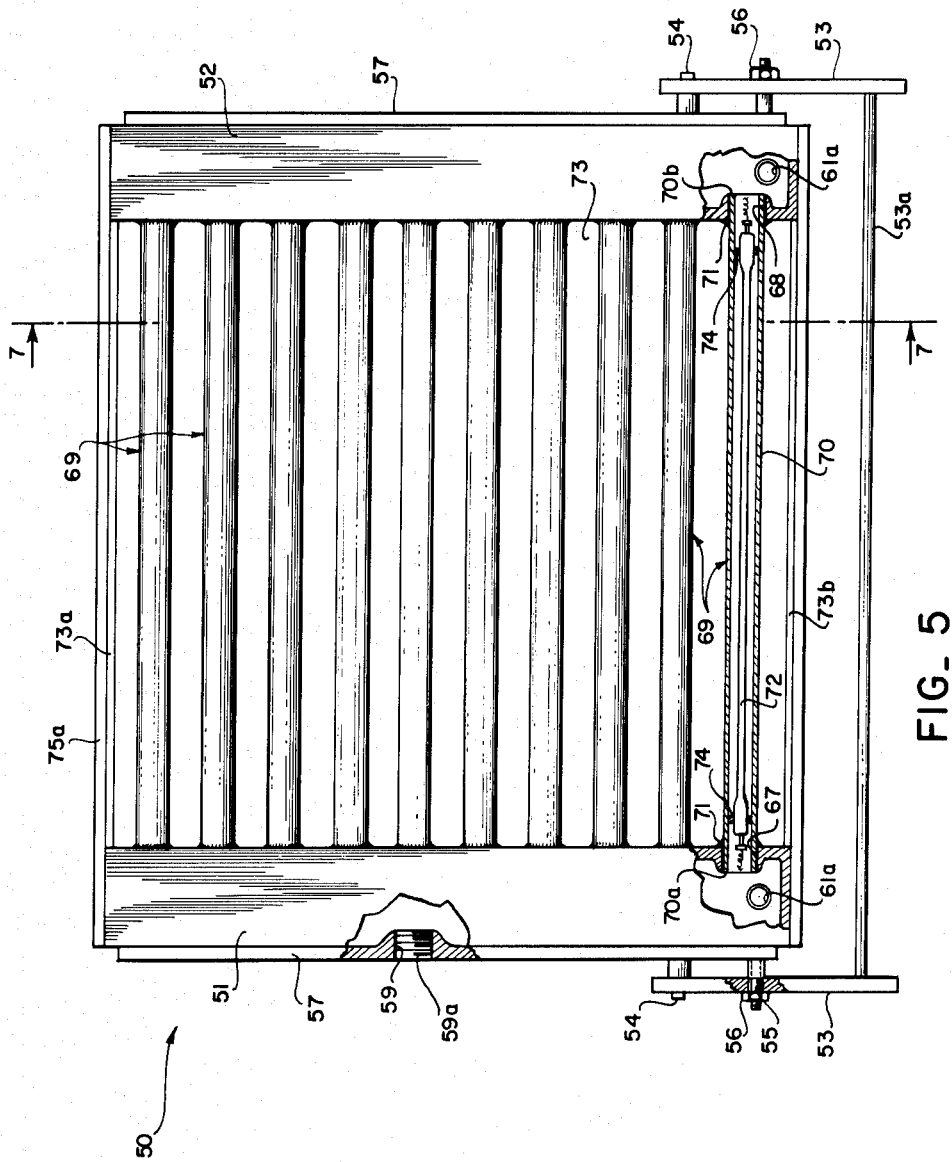
FIG_ 5
INVENTOR.
JOHN P. BUSBY, SR.,
BY
*George C. Sullivan*
Agent

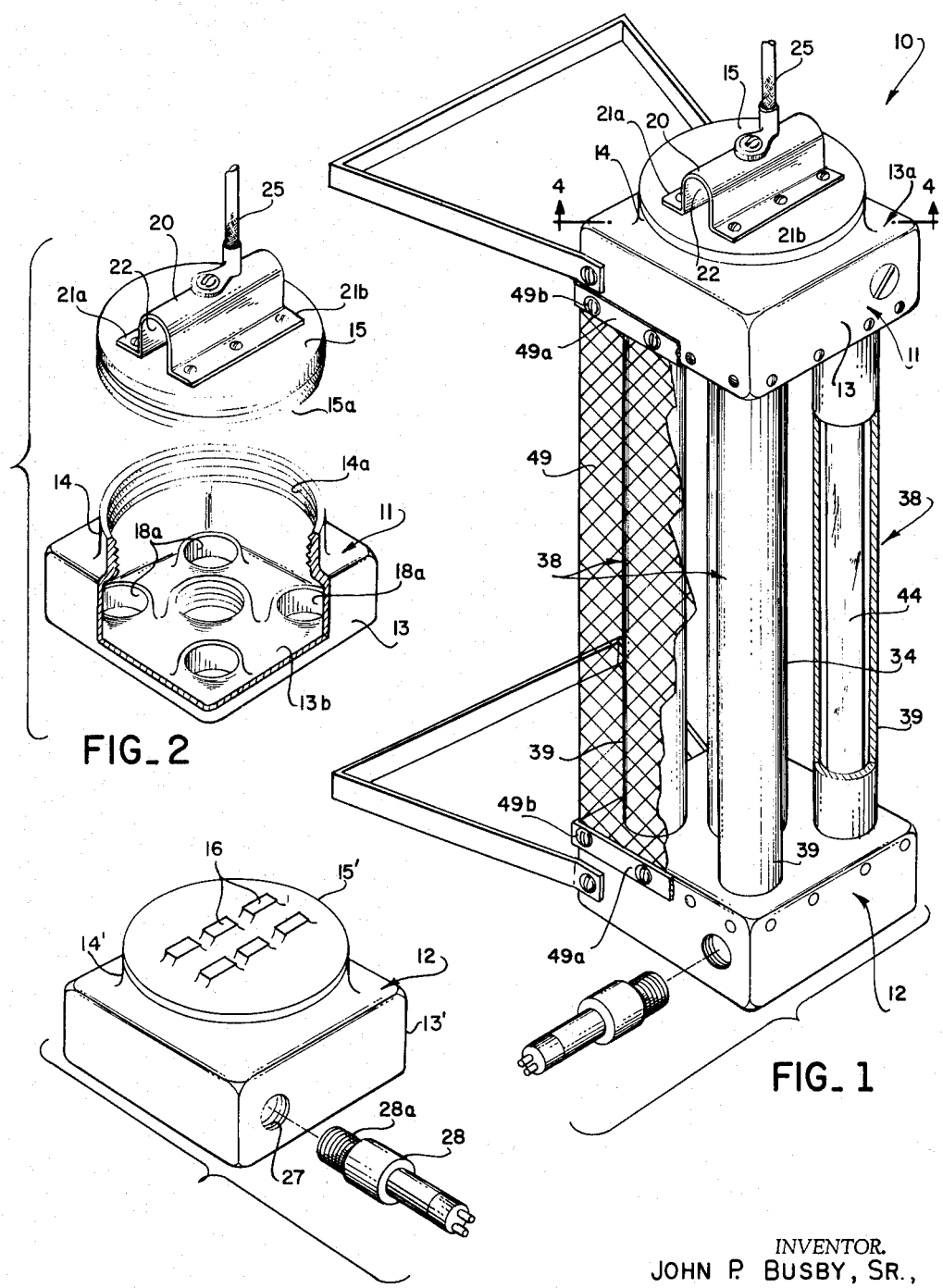

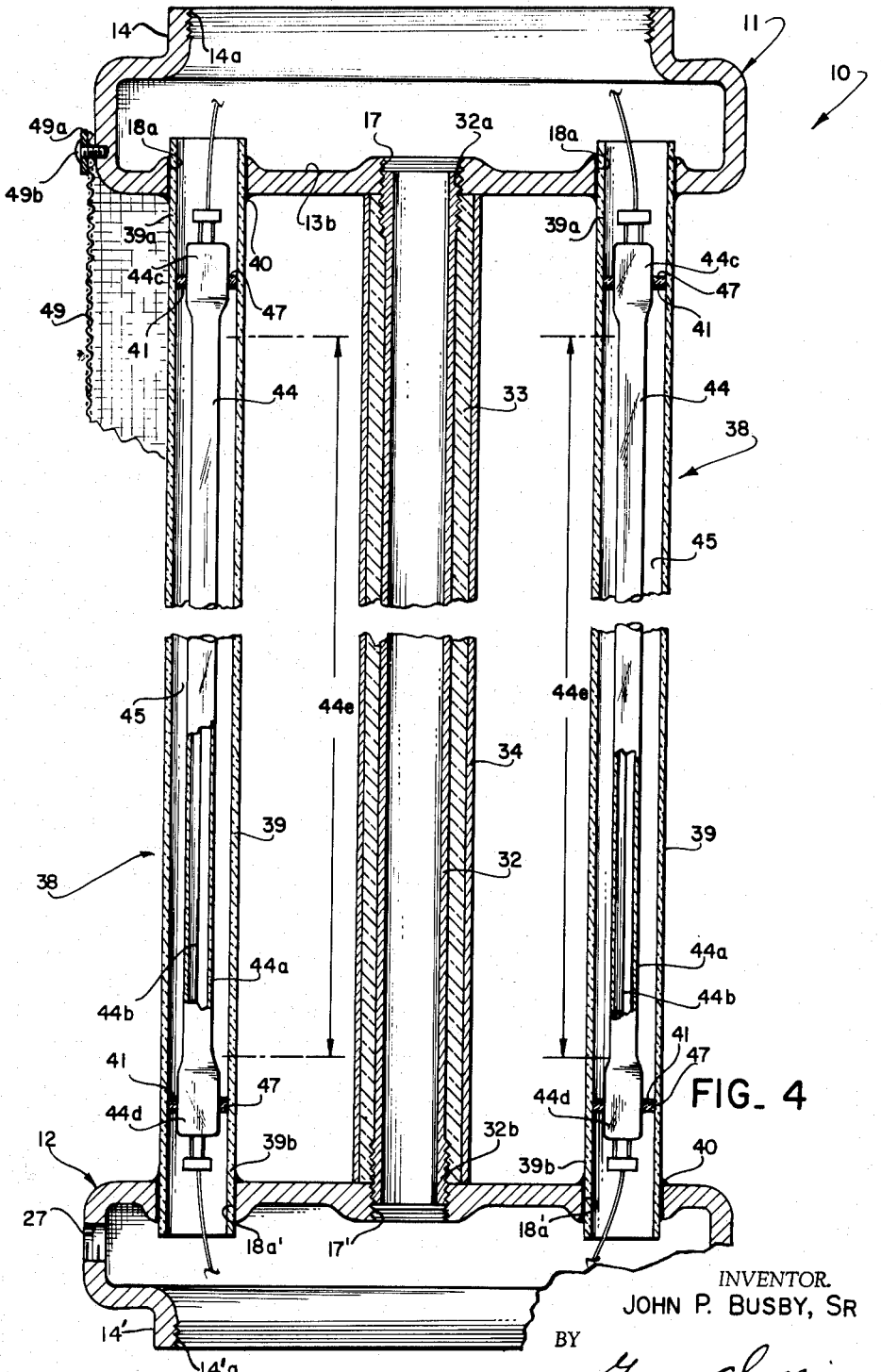

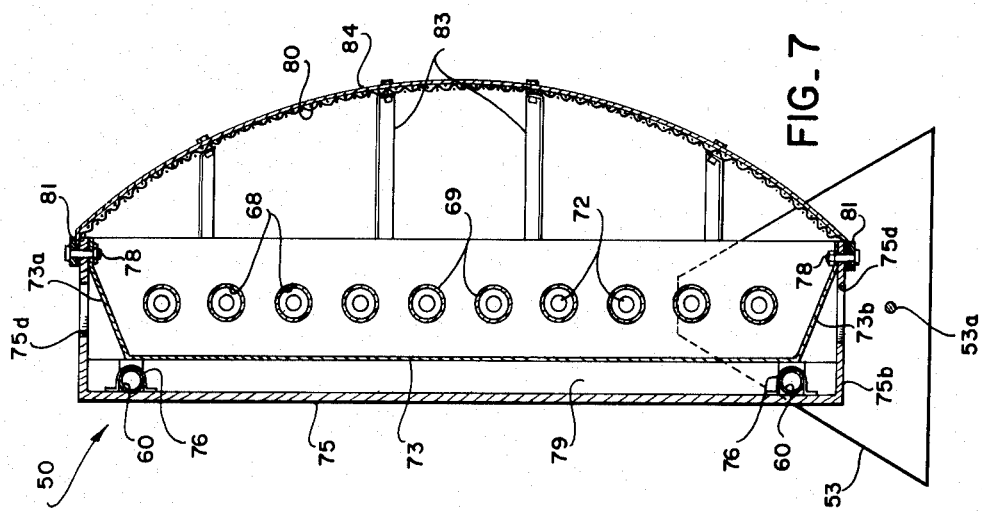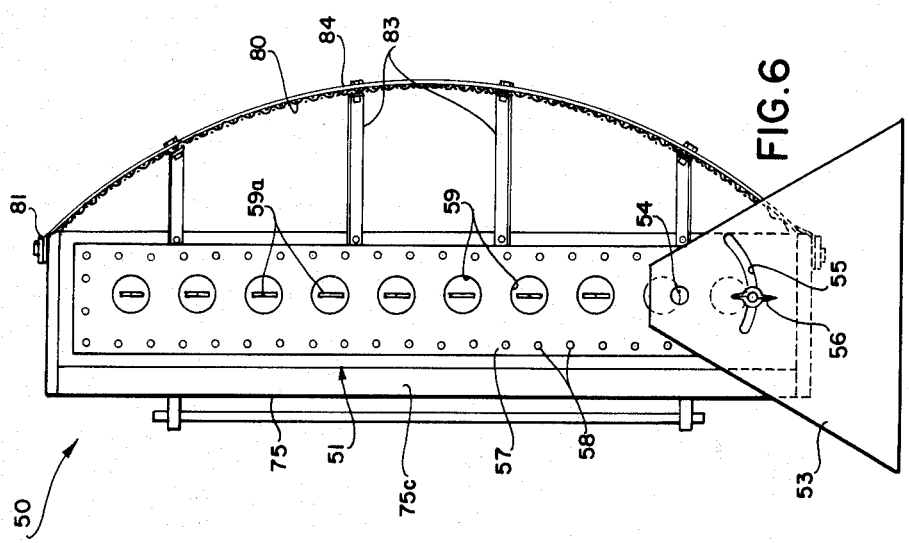

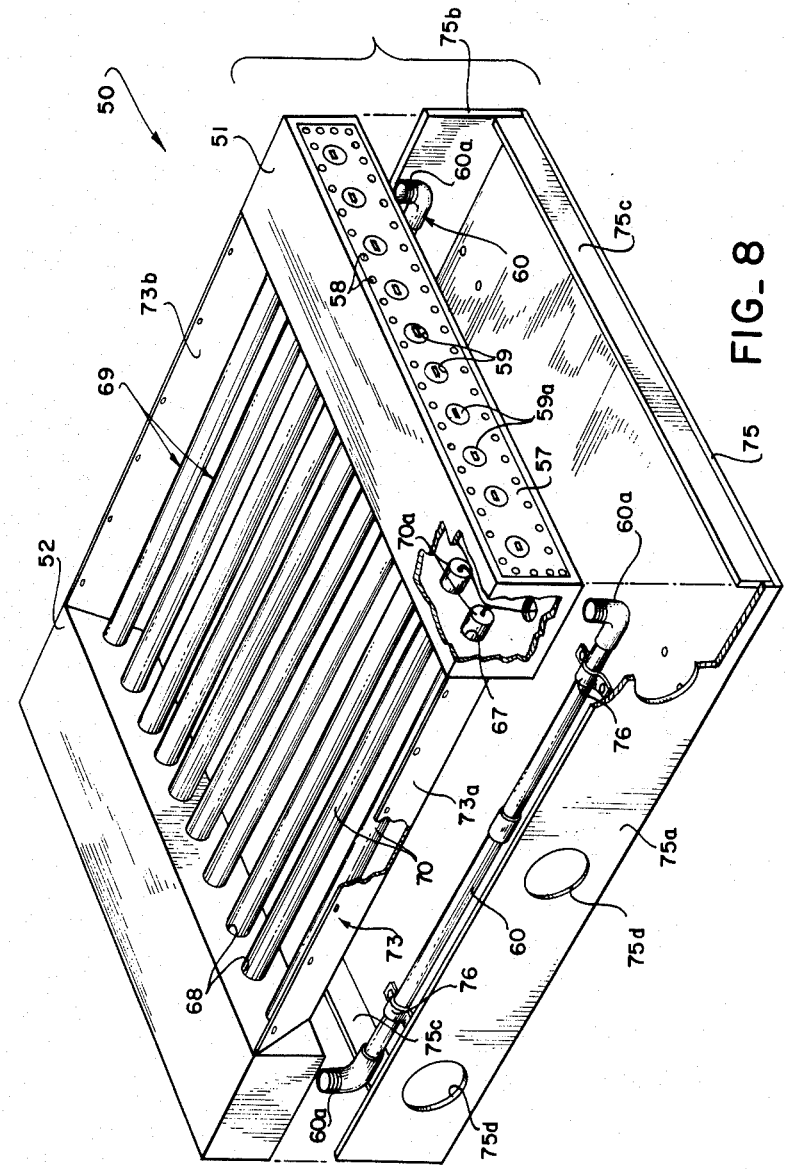

United States Patent Office 3,204,085
Patented Aug. 31, 1965

3,204,085
HEATING DEVICE
John P. Busby, Sr., Buena Vista, Ga., assignor to Lockheed Aircraft Corporation, Burbank, Calif.
Filed Aug. 15, 1962, Ser. No. 217,141
9 Claims. (Cl. 219—346)

This invention relates to a heating device, and more particularly to an explosion proof heater embodying infrared lamp heating elements.

The heater of this invention, in that it utilizes infrared lamp heating elements, provides an economical source of heat in extremely cold environments. Being small and compact, the heater is easily transported and useable in an area where space is limited. Because the heater operates on the principle of irradiation, it has the important advantage over conventional conduction heaters of being particularly adapted for use in the outdoors where shielding from the wind is not available. The infrared lamp heating elements are mounted in quartz protective tubes, which tubes have the characteristics of having an extremely low coefficient of thermal expansion, a low coefficient of thermal conductivity, and strength that increases with an increase in temperature up to in the order of 2,500° F. Thus, the heater of this invention when lighted may be immersed in or sprayed with liquids such as water without fear of cracking the protective tubes. Further, the infrared lamps are mounted in the quartz protective tubes and insulated such that they may be used in an atmosphere having a combustible air/fuel mixture without fear of explosion.

To render the heater explosion proof, the protective tubes, having infrared lamp units therein, are secured in sealed relation between hollow explosion proof support members. In accordance with another important aspect of the invention, the infrared lamps are mounted within quartz protective tubes between hollow explosion proof end support members in a unique manner to minimize heating of the support members, thus eliminating the requirement for complex and expensive heat dissipating radiators, insulation and the like.

It is therefore an object of this invention to provide a small, compact, easily transportable infrared heater having at least one infrared lamp mounted in a quartz protective tube.

Another object of this invention is to provide a transportable infrared heater having a plurality of infrared lamp heaters disposed in sealed quartz protective tubes mounted between spaced apart hollow explosion proof support members.

Still another object of this invention is to provide an infrared heater including spaced apart support members, a central reflector mounted between the support members, and infrared lamps mounted in protective tubes between the support members and spaced about the central reflector.

Another object of this invention is to provide an infrared heater including at least one infrared lamp, spaced apart support members and a quartz tube encircling the infrared lamp with the ends of the quartz tube extending beyond the ends of the infrared lamp and supported by the support members.

A further object of this invention is to provide an explosion proof infrared heater having a central tubular reflector mounted between hollow, explosion proof spaced apart support members, quartz tubes mounted in sealed relation between the support member in spaced relation about the reflector, infrared lamps of a shorter length than the quartz tubes mounted within the quartz tubes, and electrical leads connecting the infrared lamps in circuit connection within the support members.

Still a further object of this invention is to provide spaced apart hollow support members, a central support tube mounted between the support members, a reflector encircling the support tube, infrared lamps mounted between the support members in spaced relation about the reflector, electrical leads interconnecting the infrared lamps in circuit connection in the support members and extending through the central reflector, and insulation disposed between the reflector and the electrical leads.

Another object of this invention is to provide an infrared heater including spaced apart support members, a plurality of quartz tubes mounted in the same plane between the support members and an infrared lamp mounted in each of the quartz tubes.

Still another object of this invention is to provide spaced apart hollow explosion proof support members and explosion proof infrared heating units supported by the support members includnig a quartz tube having its opposite ends connected in sealed relation to the support members, an infrared lamp mounted in the quartz tube and having its electrical wires extending into the interior of the support members, and a reflector for directing the infrared light emanated by the lamps.

Other objects and advantages will become apparent from the following description taken in connection with the accompanying drawings in which:

FIGURE 1 is a perspective view partially in section of one embodiment of the heater of this invention;

FIGURE 2 is an exploded perspective view partially in section of a first support member of the heater of FIGURE 1;

FIGURE 3 is an exploded perspective view of another support member of the heater of FIGURE 1;

FIGURE 4 is a sectional elevational view of the heater taken along the reference line 4—4 of FIGURE 1;

FIGURE 5 is a front elevational view partially in section of another heater embodiment of this invention;

FIGURE 6 is a side elevational view of the heater of FIGURE 5;

FIGURE 7 is a sectional elevational view taken along the reference line 7—7 of FIGURE 5; and FIGURE 8 is a partially exploded perspective view of the heater of FIGURE 5.

Generally stated, this invention relates to an explosion proof infrared heater having spaced apart hollow explosion proof support members, a reflector mounted between the support members, and a plurality of infrared lamps mounted in quartz protective tubes, the reflector arranged to direct infrared light from the lamps outwardly from the heater.

More specifically, there is shown in FIGURES 1, 2, 3 and 4 the heater 10 having spaced apart support members 11 and 12. The support member 11 is hollow and preferably has a rectangular body portion 13, from one side 13a of which axially extends an access opening in the form of a hollow cylindrical neck 14 having internal threads 14a. A cylindrical closure or cap 15 having threads 15a on its peripheral surface adapted for close tolerance cooperating engagement with the threads 14a is provided for closing the neck 14. An elongate U-shaped member 20 having outstanding flanges 21a and 21b is secured by its flanges to the top of cap 15 by screws to form the opening 22. Member 20 additionally may have a support line 25 secured thereto as by a screw. By the insertion of a handle into the opening 22 of member 20, the cap 15 may be tightened or loosened relative to the neck 14. Also, a bail or carrying handle (not shown) is readily engaged with the opening 22. The bottom 13b of the body 13, best seen in FIGURE 2, is provided with a tapered threaded central through hole 17 and preferably four through holes 18a, symmetrically spaced about the central through hole, each of which is circumscribed by an upstanding boss.

Support member 12 is substantially identical to the support member 11; therefore, the support member 12 will not be described in detail, but instead the component parts thereof which are identical to the component parts of support member 11 have been given prime reference numerals which correspond to the reference numerals of the component parts of support member 11. It should be noted, however, that support member 12 differs from support member 11 in that it is provided with a threaded opening 27 with which the threaded end 28a of explosion proof electrical connector 28 is threadably engaged, for connecting the infrared lamps to a source of power, and the cap 15' is provided with bosses 16 defining a slot for engagement by a rod for tightening the cap relative to the neck 14'.

As best seen in FIGURE 4, a spacer or support tube 32 having tapered threaded ends 32a and 32b is mounted between the support members 11 and 12 with its threaded ends 32a and 32b threadably received in the tapered threaded central through holes 17 and 17' of support members 11 and 12, respectively. The tube 32 is encircled or covered throughout its length with an insulator material 33, preferably spun Fiberglas. For reflecting the radiant energy of the heater units in all directions, the insulator 33 and the tube 32 are encircled throughout their lengths by a reflector 34, preferably aluminum lighting plate.

Heating units 38, each comprising a quartz protective tube 39 having an infrared lamp 44 mounted therein are supported in spaced apart relation about the central reflector 34 between the support members 11 and 12. Each protective tube 39 is mounted with its terminal ends received in the opposed aligned through holes 18a and 18a' of hollow support members 11 and 12, respectively. The terminal ends of the protective tube 39 extend into the interior of the hollow support members 11 and 12 a short distance to facilitate their being secured in sealed relation to the support members. Through holes 18a and 18a' are of slightly larger diameter than the protective tube 39, and the ends of the protective tubes are secured therein by coating the ends of the protective tubes with electrically neutral, heat resistant, water tight, and vapor proof sealant 40 and by building up the sealant around the hole. The tapered threaded ends of support tube 32 are also preferably coated with a sealant 40 to assure an explosion proof seal.

Each lamp 44 comprises a tubular quartz housing 44a encapsulating the filament 44b. As best seen in FIGURE 4, each lamp 44 has a length less than the quartz protective tube 39 and is mounted within the protective tube 39 substantially centrally thereof with its terminal ends 44c and 44d disposed inwardly of the terminal ends 39a and 39b of the protective tube 39 at their connection to the support members 11 and 12, respectively. Lamp 44 is secured in place within the protective tube 39 by porcelain end walls 47 at the ends thereof such that thermal insulating air space 45 is formed between the lamp 44 and the protective tube 39 in the lighted portion 44e of lamp 44. In the mounting of each lamp 44 in a protective tube 39, a ring of inorganic silica base fibrous insulator material 41 is secured to the ends of lamp 44, and flowable ceramic cement is then poured into the ends of the tube 39 so as to form the end walls 47 when cured.

The filament temperature of infrared lamp 44 is in the order of 2,500° F. and the outside surface temperature of lamp 44 is in the order of 1,900° F., while the automatic ignition temperature of JP-4 fuel, for example, is in the order of 450° F. It will be seen, therefore, that a substantial reduction in temperature is necessary before lamp 44 may be used as a heating unit in the proximity of fuels without creating an explosion hazard. Toward this end, each lamp 44 is encapsulated in a quartz protective tube 39 with the insulating air space between the lamp 44 and the tube 39 to reduce the exterior surface temperature of the heating unit thus formed to a safe level. By way of example, tests have shown that the exterior surface temperature of the quartz tube 39 in the lighted region of lamp 44 is in the order of 180° F.

The protective tube 39 has an extremely low coefficient of thermal conductivity. In fact, when the lamp 44 is lighted, the area of the quartz tube between the lamp 44 and the support members may be grasped between the fingers without burning or discomfort. It will be seen, therefore, that the mounting of the lamp 44 with its terminal ends supported in insulating end walls 47 inwardly of the connection of the protective tube 35 and the support members 11 and 12 provides excellent means for protecting the support members from heating, thus virtually eliminating explosion hazards and facilitating the handling of the heater.

The infrared lamps 44 may be electrically interconnected in parallel circuit and to the electrical connector or in series circuit. In both cases, all the electrical connections are made in the hollow support members 11 and 12 by removal of the closure caps thereof. If the parallel circuit is selected for use, an electrical lead extends through support tube 32; however, if a series circuit is selected for use, there is no electrical lead extending through the support tube 34. Further, heater 10 is provided with a screen 49 which is secured in place by metallic strips 49a and screws 49b to prevent the receipt of a burn by physical contact with the heating units 38.

Referring now to FIGURES 5, 6, 7 and 8, therein shown is the infrared explosion proof heater 50 which is an alternate embodiment of the heater of this invention. Heater 50 is particularly adapted to heat a large area in front of the heater. To this end, a plurality of infrared heating units are mounted in spaced apart relation in the same plane between explosion proof support members and a reflector is disposed in spaced apart relation from the heating units for reflecting infrared rediations to the front of the heater.

More specifically, heater 50 comprises hollow explosion proof support members 51 and 52 mounted on an adjustable base including arcuately adjustable truncated triangular legs 53 which are fixed for movement as one by interconnecting rod 53a. Legs 53 are made arcuately adjustable by the pivotal mounting of each leg 53 on a pivot pin 54 and by providing the arcuate slot 55 in the leg 53 cooperating with lock bolt and nut assembly 56. Support members 51 and 52 are each provided with access openings closed by plates 57 which are secured in place by screws 58, and plates 57 are provided with access holes 59 which are closed by slotted caps 59a. Support members 51 and 52 are rigidly structurally interconnected by two spaced apart pipe assemblies 60, best seen in FIGURE 8, the ends 60a of which are elbows threadably engaged with threaded holes in support members 51 and 52.

As best seen in FIGURE 5, the confronting sides of support members 51 and 52, respectively, are provided with oppositely aligned through holes 67 and 68. Heating units 69, each comprising a quartz tube 70 having an infrared lamp 72 therein, are mounted in spaced apart relation and in the same plane between support members 51 and 52. Each quartz protective tube 70 is mounted with its opposite ends 70a and 70b received in aligned through holes 67 and 68 and extending into the interior of hollow support members 51 and 52. The ends of tubes 70 are sealed with respect to the support members 51 and 59 by electrically neutral, heat resistant, water tight, vapor proof sealant 71 in the same manner as protective tubes 39 are secured to support members 11 and 12 as set forth above. Each infrared lamp 72 is preferably mounted within a protective tube 70 with its opposite ends mounted in insulating porcelain end walls 74 inwardly of the connection of the tube 70 to the support members 51 and 52. Although it is desirable to mount lamps 72 with their ends spaced from the support members, it should be noted that the terminal ends of the lamps could be extended into the interior of support members 51 and 52 without causing injurious heating thereof provided that the lighted areas of the lamps are not covered by the support members. The lamps 72 are connected in either parallel or series electrical circuit within support members 51 and 52 and by an explosion proof connector to a source of power, while the pipe assemblies 60 serve to carry the electrical leads of the lamps between the support members.

From the foregoing it will be seen that the heater 50 of this invention is capable of being explosion proofed and capable of use in the presence of fuel, this capability being provided by the mounting of infrared lamps 72 in quartz tubes 70 and the sealing of the tubes 70 with respect to the support members 51 and 52. It will further be appreciated that explosion proofing of the heater 50 is accomplished by the vapor sealing of the hollow interiors of support members 51 and 52 with respect to the outside environment. To this end, the access plate 57, access bolts 59 and pipe assemblies 60 are vapor tight sealed with respect to the support members 51 and 52.

The heater unit 50 as above described is capable of use where it is desired to heat areas on each side of the heating units 69. It is within the contemplation of this invention to direct radiant energy emanated by the heating units 69 to one side only of the heater. Accordingly, there is provided a reflector 73, preferably polished aluminum lighting plate, best seen in FIGURES 7 and 8, having its opposite ends 73a and 73b angularly inclined with respect to the main body portion thereof. Heater 50 is also provided with a back plate 75 having top and bottom flanges 75a and 75b and side flanges 75c. The back plate 75 fixedly supportingly mounted on the pipe assemblies 60 by bolts which are engaged with the flanges of collars 76, FIGURE 8, mounted on pipe assemblies 60. In the emplaced position of back plate 75, the top and bottom flanges 75a and 75b thereof are seated on the tops and bottoms of the support members 51 and 52 and the side flanges 75c thereof are in engagement with the back sides of the support members. Reflector 73 is mounted between the heating units 69 and pipe assemblies 60 by securing the opposite ends 73a and 73b thereof to the top and bottom flanges 75a and 75b of back plate 75 by screws 78. The aluminum lighting plate reflector 73 could be used alone and supported from the support members 51 and 52 with excellent results; however, there is a possibility that one would be burned if body contact were made with the reflector. In this regard it should be noted that an aluminum lighting plate reflector 73 reflects approximately 94% of the radiant heat impinging thereon. Consequently, when heater 50 is in operation, the temperature of the reflector 73 will be greater than 125° F., the proximate temperature at which a burn can be experienced, but substantially less than the automatic ignition temperature of fuels. For protecting one from receiving a burn by contact with the reflector 73, the back plate 75 is mounted in spaced apart relation from the reflector 73 to provide the insulating air space 79 therebetween. Tests have shown that the mounting of back plate 75 in spaced apart relation from reflector 73 reduces the temperature of the back plate 75 to a level sufficiently low for personnel safety. It is possible, however, that when heater 50 is used for an extended period of time, air in space 79 will become heated, rise to the top of the space and create hot spots on flange 75a. To alleviate this problem, the holes 75d are provided in flange 75a to vent hot air which may become accumulated at the top of space 79. To prevent personnel from being burned by coming in direct contact with heater units 69, the front of heater 50 is covered with a concave wire mesh screen 80. Screen 80 is secured in place to top and bottom flanges 75a and 75b by metallic strips 81 which are mounted on top of the screen and secured as by the screws 78 to the top and bottom plates. To hold screen 80 in its concave configuration, angle irons 83 are secured to the side edges of support members 51 and 52, and metallic strips 84 are secured to the flanges of the angle irons in covering relation to the screen 80. Screen 80 is made concave because the hottest part of heater 50 is in the front central portion thereof.

It will be seen that the infrared heaters as described in detail above are of unique construction being explosion proof, unaffected by extreme temperature changes, and capable of use in unshielded areas. Also, the heaters are of simple construction and the components thereof have long life; consequently, the heaters are relatively inexpensive to manufacture and maintain.

While particular embodiments of the invention have been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. A heater comprising: spaced apart hollow explosion proof support members; a plurality of quartz tubes connected in sealed relation to said support members; an infrared lamp mounted in each of said tubes with the ends of said lamp spaced inwardly from the ends of said tube at the connection of said tubes to said support members; electrical leads connecting said lamps in electrical circuit within said support members; and an explosion proof electrical connector connected to one of said support members and to the electrical leads therein.

2. The heater of claim 1 further comprising a reflector for reflecting the infrared light emanated by said lamps in a pre-selected direction, said lamps being spaced in a circle between said support members in surrounding relation to said reflector.

3. The heater of claim 1 further comprising a reflector for reflecting the infrared light emanated by said lamps in a pre-selected direction, said lamps being spaced apart in substantially the same plane between said support members; and said reflector being disposed in a plane parallel to the plane containing said heating units and disposed in spaced apart relation from said heating units.

4. A heater comprising: spaced apart hollow explosion proof support members; a cylindrical reflector disposed between said support members; aligned holes in the confronting ends of said support members and spaced about said reflector; quartz tubes having their opposite ends received in said aligned holes and sealed with respect thereto; an infrared lamp mounted in each of said tubes with the ends thereof disposed inwardly from the ends of said tubes at their connection to said support members; insulating end caps mounting said lamps in said tubes; and electrical leads connected in circuit arrangement within said support members and by an explosion proof connector to a source of power.

5. A heater comprising: spaced-apart hollow explosion-proof support members; at least one quartz tube connected in sealed relation to said support members; and an infrared lamp mounted in said tube with its lighted region disposed inwardly from the ends of said tube at their connections to said support members.

6. The heater of claim 5 wherein a reflector is provided for reflecting the infrared light emanated by said lamp in a preselected direction.

7. A heater comprising: spaced-apart hollow explosion-proof support members; a plurality of pairs of aligned holes in confronting ends of said support members; a plurality of quartz tubes, each having their opposite ends received in a pair of said aligned holes and sealed with respect thereto; an infrared lamp mounted in each of said tubes with the ends thereof disposed inwardly from the ends of said tubes at their connections to said support members.

8. A heater comprising: spaced-apart hollow explosion-proof support members and a plurality of spaced-apart heating units disposed substantially in the same plane, each including a quartz tube connected between said support members and an infrared lamp mounted in said tube with its ends spaced inwardly from the ends of said tube.

9. The heater of claim 8 wherein a reflector is mounted relative to said support members so as to reflect infrared light rays emanated from said heating units in a desired direction.

References Cited by the Examiner
UNITED STATES PATENTS

| | | | |
|---|---|---|---|
| 1,076,858 | 10/13 | Andrews | 338—237 |
| 1,341,581 | 5/20 | Peterson | 313—312 |
| 1,418,667 | 6/22 | Muir | 219—474 |
| 1,552,767 | 9/25 | Shoenberg et al. | 219—365 |
| 1,839,479 | 1/32 | Hartman | 313—312 X |
| 1,906,188 | 4/33 | Smally | 313—312 X |
| 1,909,593 | 5/33 | Parsons | 219—489 |
| 2,045,361 | 6/36 | Leonard | 338—237 |
| 2,164,183 | 6/39 | Van Liempt et al. | |
| 2,164,307 | 7/39 | Brandt | 313—312 |
| 2,180,141 | 11/39 | Dorgelo | 313—312 X |
| 2,384,670 | 9/45 | Fisher | 219—347 |
| 2,457,353 | 12/48 | Davis | 313—312 X |
| 2,535,268 | 12/50 | Coats | 219—553 |
| 2,551,039 | 5/51 | Nelson | 219—349 |
| 2,590,336 | 3/52 | Mast | 219—368 X |
| 2,684,420 | 7/54 | Fox | 338—228 X |
| 2,844,694 | 7/58 | Lefebvre. | |
| 2,894,107 | 7/59 | Lefebvre | 219—538 X |
| 2,973,498 | 2/61 | Calvert | 219—536 X |
| 3,005,081 | 10/61 | Kordes et al. | 219—343 X |
| 3,059,086 | 10/62 | Pedersen | 219—343 |
| 3,108,171 | 10/63 | Vary | 219—347 X |

RICHARD M. WOOD, *Primary Examiner.*